United States Patent
Greilinger et al.

(10) Patent No.: US 7,793,561 B2
(45) Date of Patent: Sep. 14, 2010

(54) THREADED NUT MEANS FOR A LINEAR DRIVE DEVICE

(75) Inventors: Daniel Greilinger, Ormalingen (CH); Thomas Wyss, Sissach (CH); Marcel Soltermann, Cedarburg, WI (US)

(73) Assignee: AB SKF, Göteborg (SE)

(*) Notice: Subject to any disclaimer, the term of this patent is extended or adjusted under 35 U.S.C. 154(b) by 1241 days.

(21) Appl. No.: 11/314,453

(22) Filed: Dec. 21, 2005

(65) Prior Publication Data
US 2006/0144179 A1    Jul. 6, 2006

(30) Foreign Application Priority Data
Dec. 22, 2004   (CH) .................................. 02125/04

(51) Int. Cl.
*F16H 1/18* (2006.01)
(52) U.S. Cl. .................. 74/424.72; 74/89.35; 74/89.26
(58) Field of Classification Search ................ 74/89.35, 74/89.23, 89.26, 424.71, 424.72
See application file for complete search history.

(56) References Cited

U.S. PATENT DOCUMENTS

| 2,319,551 | A |   | 5/1943 | Linden et al. |   |
|---|---|---|---|---|---|
| 3,799,292 | A | * | 3/1974 | Katz | .......................... 187/267 |
| RE31,627 | E | * | 7/1984 | Evans | ........................ 74/89.31 |
| 4,872,903 | A | * | 10/1989 | Periou | ........................ 74/89.38 |
| 5,553,825 | A | * | 9/1996 | Rasmussen | ............... 248/354.3 |
| 6,234,034 | B1 | * | 5/2001 | Ando | ........................ 74/89.14 |
| 2005/0016305 | A1 | * | 1/2005 | Lardy et al. | ................. 74/89.42 |
| 2005/0103138 | A1 | * | 5/2005 | Chen et al. | .................. 74/89.26 |
| 2005/0132831 | A1 | * | 6/2005 | Scholz | ........................ 74/89.26 |
| 2007/0214902 | A1 | * | 9/2007 | Wang | ........................ 74/89.26 |

FOREIGN PATENT DOCUMENTS

| EP | 1 134 454 | 9/2001 |
|---|---|---|
| GB | 1 409 961 | 10/1975 |

* cited by examiner

*Primary Examiner*—David M Fenstermacher
(74) *Attorney, Agent, or Firm*—McGlew and Tuttle, P.C.

(57) ABSTRACT

A threaded nut is provided for a linear drive having a rotatable spindle. The threaded nut is provided with a main nut, wherein the main nut is intended for being arranged with its internal thread on the external thread of the spindle, and is intended to perform a translatory displacing motion during a rotary motion of the spindle. The threaded nut has, furthermore, a safety nut, which is intended not to mesh by its internal thread with the external thread of the spindle during the normal operation of the linear drive and to mesh with the thread of the spindle in case of failure of the main nut. To make possible simple mounting in case of such a threaded nut means and to reduce the risk for incorrect alignment, the main nut (11) has a first part and a second part. The two parts are located at spaced locations from one another and each part being provided with a threaded section (18a, 18b) of the main nut (11), wherein the safety nut (12) is intended to be arranged between the two threaded sections (18a, 18b).

21 Claims, 2 Drawing Sheets

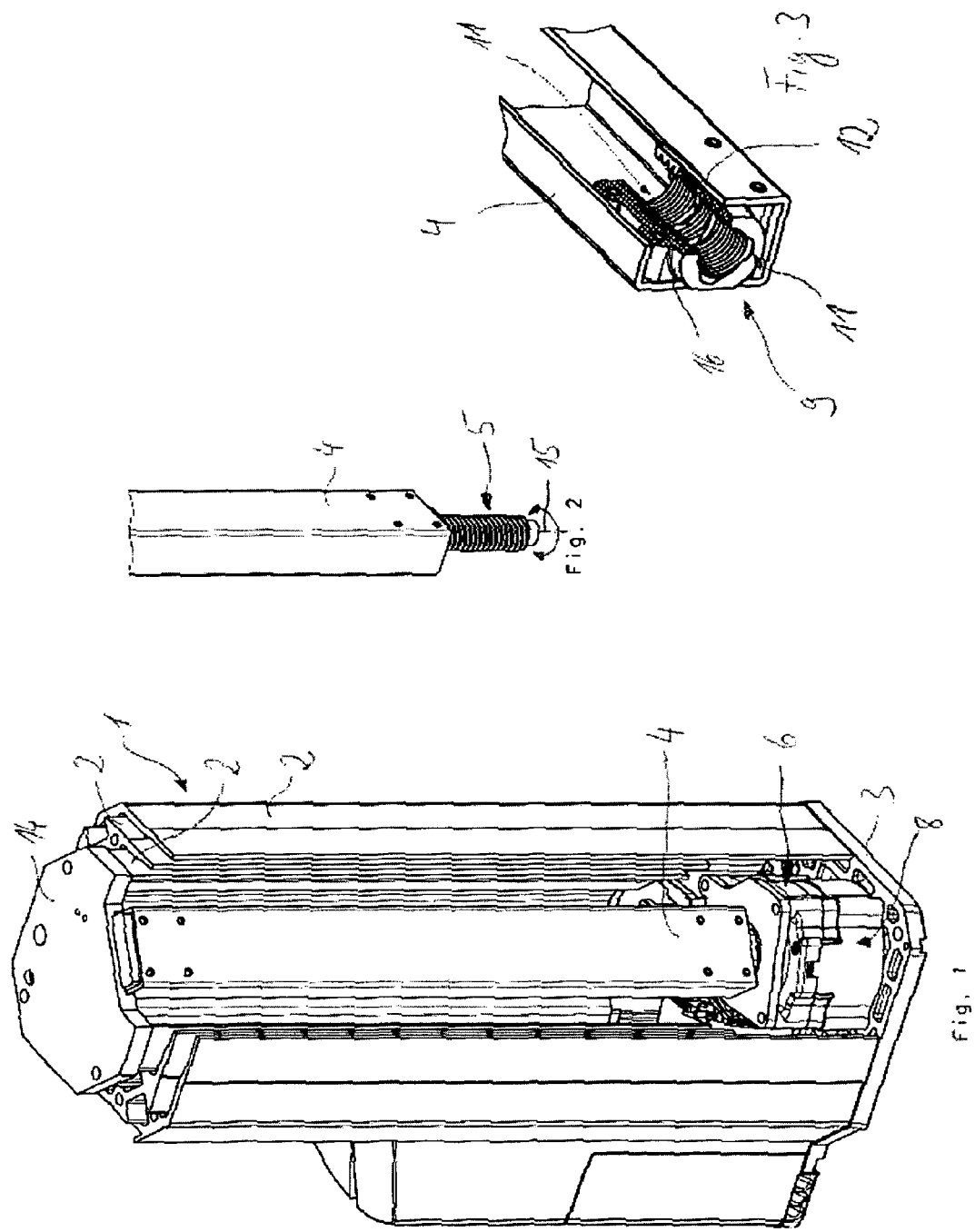

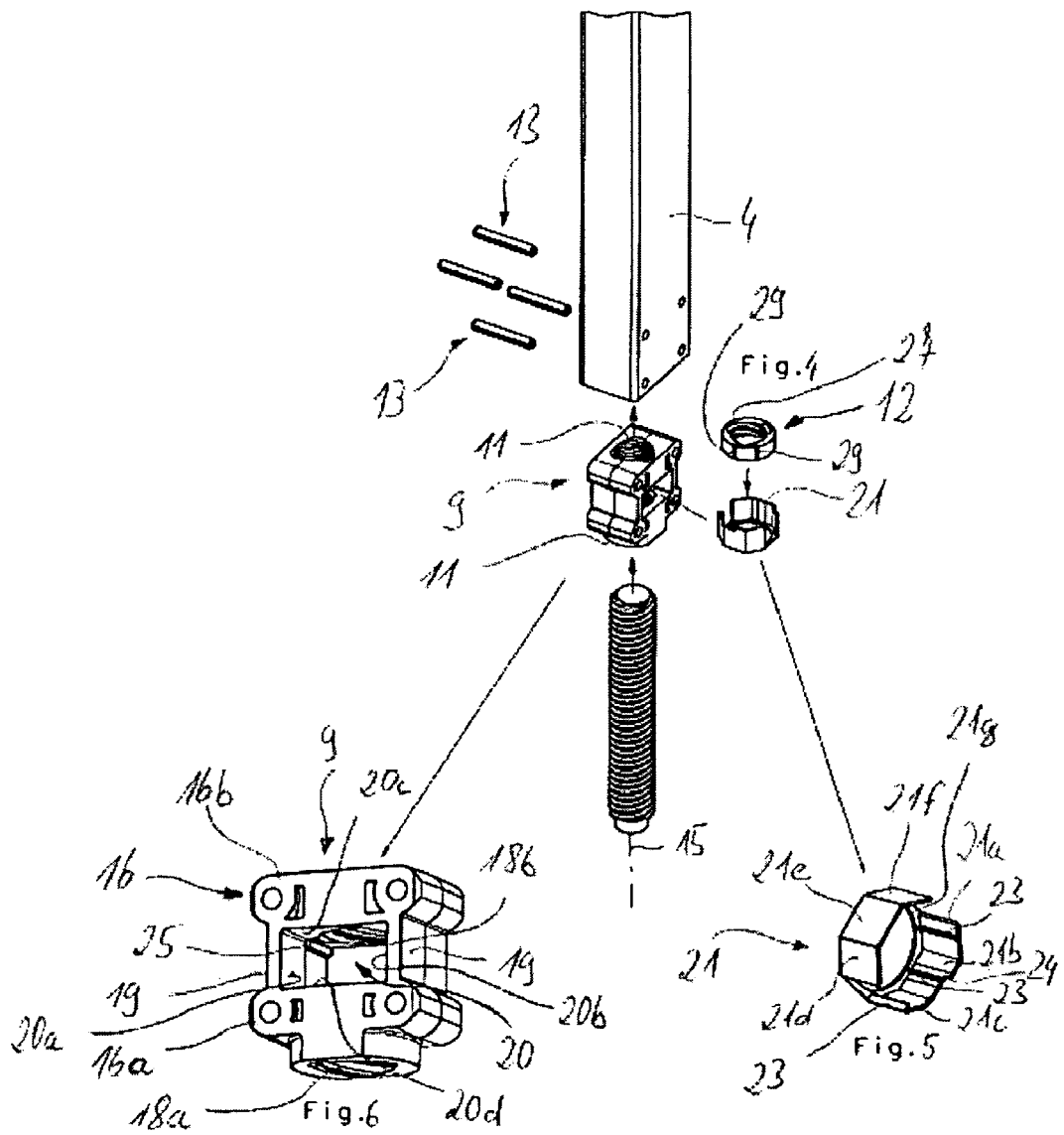

THREADED NUT MEANS FOR A LINEAR DRIVE DEVICE

CROSS REFERENCE TO RELATED APPLICATIONS

This application claims the benefit of priority under 35 U.S.C. §119 of Swiss Patent Application CH 02125/04 filed Dec. 22, 2004, the entire contents of which are incorporated herein by reference.

FIELD OF THE INVENTION

The present invention pertains to a threaded nut means for a linear drive device, which is provided with a rotatable spindle and with a main nut, wherein the main nut is intended for being arranged with its internal thread on the external thread of the spindle, and is intended to perform a translatory displacing motion during a rotary motion of the spindle, and has, furthermore, a safety nut, which is intended not to mesh with the external thread of the spindle with its internal thread during the normal operation of the linear drive and to mesh with the thread of the spindle in case of failure of the thread of the main nut.

BACKGROUND OF THE INVENTION

Linear adjusting motions are needed in many industrial areas. Linear drive devices, which transform a rotary drive motion, for example, of an electric motor, into a translatory motion by means of a spindle and a nut arranged on the spindle, are often used to generate this motion. The nut is secured here against rotary motions, as a result of which it performs a purely translatory motion. This motion of the nut is utilized as an adjusting motion for a load to be moved. Possible applications of such linear drive devices are, for example, lifting columns, linear drives and the like.

It was found that various circumstances may lead to failure of the nut, especially of the thread of the nut. Without taking safety measures against this, the nut would be freely mobile on the spindle. This may lead to considerable damage to the load and the linear drive device especially in case of vertical orientation of the spindle and heavy loads. If persons or loads located in the vicinity of persons are to be moved with such drives, these persons are at great risk.

Systems with safety nuts, which begin to act when the nut that has the carrying function during normal operation fails, have therefore already been developed. The safety nut usually has a thread for this, which does not bear the load as long as the main nut does and consequently has not yet failed. The safety nut is prevented for this purpose from performing a rotary motion, so that the safety nut cannot run up on the flank of the main nut and the thread of the safety nut cannot mesh with the thread of the spindle as a result.

It was therefore already proposed in EP 1 134 454 A1 that a metallic safety nut be arranged at one end of the main nut in a hollow cylindrical recess, which is provided with two diametrically opposed carriers. On its circumferential surface, the safety nut is provided with four notches offset by 90° each in relation to one another. With two of its notches, the safety nut meshes with these two carriers and is thus aligned in relation to the main nut in reference to its rotary position. However, it is to be feared that despite this arrangement during the mounting of the safety nut and the main nut on the spindle, a considerable adjustment effort is needed for the exact alignment of the three elements. If exact alignment of these three elements is not carried out, this may lead to failure of the safety nut. In addition, this arrangement permits the linear drive device to operate either only as a pulling drive or only as a pushing drive depending on the order in which the main nut and the safety nut are arranged in relation to the direction of load of the drive.

SUMMARY OF THE INVENTION

The basic object of the present invention is therefore to provide a threaded nut means of the type mentioned in the introduction, which permits simpler mounting and reduces the risk of incorrect alignments.

This object is accomplished according to the present invention in a threaded nut means of the type mentioned in the introduction and with the main nut having a first part and a second part, where said two parts are located at spaced locations from one another and each part is provided with a threaded section of the main nut, wherein the safety nut is intended for being arranged between the two threaded sections.

The fact that the safety nut is mounted between two parts or sections of the main nut makes it possible to arrange the safety nut in the correct position in the axial direction of the drive without additional adjustment effort being needed for this. The safety nut can be arranged in a space between the two sections of the main nut and brought by same into the intended axial position and held there.

It may be useful in this connection if the clearance of the safety nut in the axial direction between the two sections of the main nut is smaller than the pitch of the thread of the safety nut. An unambiguously predetermined axial position of the safety nut is made possible hereby between the two sections of the main nut without additional design measures or additional adjustment effort being necessary for this. The safety nut can then find its predetermined position by itself during the mounting of the threaded nut means on the spindle. The thread of the safety nut is arranged in this case between the two sections of the main nut in an axial position in which it forms a continuation of the thread of the main nut.

However, to simplify the mounting even more, a positioning aid, which has means for arranging the safety nut in a predetermined position in relation to the main nut, may be provided for the safety nut in a preferred embodiment of the present invention. An unambiguous position of the safety nut can thus be achieved with the present invention without an additional adjustment of the safety nut in relation to the main nut becoming necessary.

In a preferred embodiment of the present invention, the positioning aid may have means for positioning the safety nut in a predetermined radial position. These means may be arranged especially in a predetermined position in relation to a thread start of the safety nut. In addition or as an alternative hereto, a positioning aid that has means for positioning the safety nut in a predetermined axial position may also be provided in other embodiments. Such a means, which is used for the radial and/or axial positioning, may be, for example, a holder, into which the safety nut can be placed.

In such embodiments of the present invention with a positioning aid, the mounting of the safety nut, including the arrangement thereof in a correct position in relation to the main nut, can be limited to insertion operations. Threaded nut means according to the present invention thus make rapid mounting possible, which nevertheless rules out the mounting errors that often were hitherto common.

Unlike in prior-art solutions, a linear drive device provided with the threaded nut means according to the present invention can assume the desired safety function both when it is used as a pushing drive and when it is used as a pulling drive. Depending on whether the load acts on the drive as a tensile force or as a working load in case of failure of the main nut, one or another part of the main nut is in contact with the safety nut and transmits the load to the safety nut. Thus, it is no longer necessary for the manufacturer of the linear drive device to mount, stock and label linear drive devices either as a pushing drive or as a pulling drive. The risk of creating and/or installing in applications an incorrect drive device is ruled out at the user of the linear drive device.

In order for the linear drive device to have similar properties in the pushing direction and the pulling direction in case of failure of the main nut, the two threaded sections of the main nut may be at least essentially of equal length.

Other preferred embodiments of the present invention appear from the claims, the description and the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The present invention will be explained in greater detail on the basis of exemplary embodiments shown purely schematically in the drawings. In the drawings:

FIG. 1 is a perspective and partially cut-away view of a lifting column, which is provided with a linear drive device according to the present invention;

FIG. 2 is a perspective detail view of a push rod with a spindle inserted into same and with a threaded nut means according to the present invention of the linear drive shown in FIG. 1;

FIG. 3 is a perspective sectional view of the push rod from FIG. 2 with the threaded nut means likewise shown in a sectional view;

FIG. 4 is a perspective exploded view of a threaded nut means according to the present invention with a holding piece, not yet mounted, and a safety nut;

FIG. 5 is an enlarged perspective view of the holding piece from FIG. 4; and

FIG. 6 is an enlarged perspective view of the threaded nut from FIG. 4.

DESCRIPTION OF THE PREFERRED EMBODIMENTS

Referring to the drawings in particular, FIG. 1 shows as one of many exemplary applications of a linear drive device according to the present invention a telescopic lifting column 1, which is provided with a plurality of telescopic tubes 2 that are movable in relation to one another. In the exemplary embodiment according to FIG. 1, the telescopic tube 2 that is the largest in terms of its cross-sectional area is connected to a stand element 3, with which the main column 1 can be arranged on a base. Each telescopic tube 2 of the lifting column is functionally connected to its telescopic tube 2 that is the next largest in terms of the cross-sectional area in such a way that an extending push rod 4, when it reaches its maximum extended length, carries the telescopic tube functionally connected to it and thus also extends this telescopic tube from the lifting column. All telescopic tubes 2 of the lifting column 1 are completely withdrawn in the view shown in FIG. 1.

A linear drive device 6, which is provided with a motor, for example, with a d.c. motor, is arranged in the interior of the lifting column 1 in the area of the stand element 3. The d.c. motor is functionally connected to a spindle 5 (not shown in detail in FIG. 2), which can be set into rotary motion by the d.c. motor. A threaded nut means 9, which has a main nut 11 and a safety nut 12 and is shown in FIGS. 2 through 6, is arranged on an external thread of the spindle 5.

The threaded nut means 9 is pushed into a lower end of the push rod 4 and is secured at same by a plurality of pins 13. The push rod 4 is in turn secured against rotary motions and fastened by a positive-locking connection at an upper cover plate 14 of the lifting column.

Due to this arrangement, a rotary motion of the spindle 5 in one direction of rotation leads to a translatory upward motion of the main nut 11 and consequently of the threaded nut means 9 as a whole. Due to the connection to the push rod 4, the latter also performs a translatory motion in parallel to the axis of rotation 15 of the spindle 5 in the upward direction. Depending on the number of revolutions of the spindle 5, one or more telescopic tubes are extended hereby from the lifting column. By contrast, the telescopic tubes are withdrawn into the lifting column by a rotary motion of the spindle 5 that is opposite the first direction of motion.

As is apparent from FIGS. 2 through 6, the threaded nut means 9 has a threaded nut body 16, which is parallelepipedic at least in a rough approximation and is manufactured by injection molding. This threaded nut body has two halves 16a, 16b, which are provided with a cylindrical recess each. A threaded section 18a, 18b of the main nut is formed in each of the cylindrical recesses. The two threaded sections 18a, 18b together form the thread of the main nut 11. One thread start of a threaded section 18b is arranged at a radial and axial point that corresponds to a continuation of the thread of the other threaded section 18a.

The two halves 16a, 16b are connected to one another in one piece by means of two webs 19. The two webs 19 leave free a recess 20 between them, into which a holding piece 21 can be inserted as a holder. The holding piece 21 provided in this exemplary embodiment according to the present invention has, on the whole, approximately a ring shape due to the legs 21a-21f being arranged on a ring part 21g lined up in a polygon-like pattern. However, in other exemplary embodiments, the holding piece could also have a completely different geometric shape, for example, it could be parallelepipedic. On three of its legs 21a, 21b, 21c, the holding piece 21 has positioning aids in the form of carriers 23, which extend in parallel to the axis of rotation 15 of the spindle 5 and protrude into the space enclosed by the holding piece 21.

The external dimensions of the holding piece 21 are selected to be such that it fits the recess 20 at least approximately and fills same. To form a means for securing against rotation for the safety nut, the holding piece 21 is in contact by the outer surfaces of its legs 21a-21f with lateral limiting surfaces 20a, 20b of the recess 20 or the outer surfaces are located at least directly opposite the lateral limiting surfaces 20a, 20b. The safety nut 12 may have a slight clearance in the recess 20 in the direction of the axis of rotation 15.

On one of its legs, the holding piece 21 is provided with a groove 24 of a predetermined width and predetermined length of the leg. The recess 20 of the threaded nut body 16 has a cam 25 for this, which is designed corresponding to the dimensions of the groove 24, so that the groove 24 can be completely accommodated in the cam 25. If the holding piece 21 is pushed completely into the recess 20, the front side of the groove 24 strikes the front-side limitation of the cam 25. Because of the groove 24 and the cam 25, the holding piece 21 can be pushed into the recess 20 in a predetermined alignment only and from one side only. The groove 24 and the cam 25 are thus used as a positioning and mounting aid, in order to ensure, on the one hand, that the holding piece 21 can be arranged in a predetermined position in the recess 20 without an additional adjustment effort. On the other hand, the groove 24 and the cam 25 also prevent the holding piece 21 from being able to be inserted into the recess 20 in an alignment other than the predetermined one.

The hollow cylindrical safety nut 12 is intended for being arranged within the holding piece 21. An external diameter of the safety nut 12 therefore also corresponds at least approximately to the distance of the respective legs 21a-21f of the holding piece 21 that are located opposite each other. As is already known, the internal thread 27 of the safety nut 12 is provided with a geometry that is coordinated with the internal thread of the main nut 11 as well as the external thread of the spindle 5 in a defined manner. This coordination is such that even though the thread 27 of the safety nut 12 is arranged within the thread of the spindle 5, it is not in contact with same as long as the thread of the main nut 11 bears load. The thread of the safety nut 12 is in contact with the thread of the spindle 5 and thus prevents an uncontrolled slipping off of the threaded nut means—and consequently also of the particular load to be borne—on the spindle 5 only in case of failure of the main nut 11.

On its circumferential surface 28, the safety nut 12 has three groove-like notches 29, which cooperate with the carriers 23 of the holding piece 21, as a positioning and mounting aid for arrangement for correct rotation in relation to the safety nut. Two of the three notches 29 can be recognized in the view in FIG. 4.

The safety nut is therefore intended for being pushed into the holding piece 21 in an unambiguously predetermined rotation position, in which the carriers 23 of the frame mesh with the notches 29 of the safety nut 12. Aside from a correct positioning of the safety nut during mounting, rotation of the safety nut in a linear drive device can thus also be reliably prevented from occurring as long as the thread of the main nut bears load.

In order for the safety nut 12 to be inserted correctly not only in terms of its radial alignment but also on the correct side, the positioning aids of the holding piece 21 and of the safety nut 12 are distributed nonuniformly on the circumference of the safety nut. Thus, all carriers 23 mesh simultaneously with the notches 29 intended for meshing in only one of the two possible rotation positions of the safety nut. At most two of the three carriers 23 can be caused to simultaneously mesh with the notches 29 in the other rotation position of the safety nut, as a result of which mounting of the safety nut in the main nut becomes impossible in this position.

The positioning and mounting aids of the safety nut and of the frame are used not only for the correct and unambiguous positioning but additionally also as predetermined breaking means. The latter is used to cause the safety nut 12 to be used in case of failure of the thread of the main nut 11. After the predetermined breaking means have been destroyed by the torque acting on them because of the sufficiently large contact between the thread of the spindle 5 and the thread of the safety nut 12, the thread of the safety nut meshes with the thread 6 of the spindle and bears the load.

The notches 29 as well as the carrier 25, on the one hand, as well as the thread start (or the thread starts in case of multiple-start threads) of the safety nut 12 are aligned in a predetermined manner in relation to one another in the radial direction. This alignment is made such that if the notches 29 are arranged in the carrier 25, the thread of the safety nut represents a continuation of the thread of the main nut. The thread of the safety nut consequently starts at a point at which the thread of the main nut would also be located if it were formed such that it would reach into the area of the safety nut. The main nut and the safety nut do, of course, have threads of equal pitch.

For mounting, the safety nut 12 is inserted into the holding piece 21 in the only possible position. The holding piece 21 with the safety nut 12 is subsequently pushed into the recess 20. Only one alignment and only one direction of pushing in is possible for this as well because of the positioning aid. The threaded nut means 9 thus preassembled is then inserted into the push rod 4 and fastened to same. The spindle 5 can now be turned into the thread 18a of the lower half 16a of the main nut 11. The spindle 5 will now find the thread 27 of the safety nut 12 by itself and will also turn into this. The thread 7 of the spindle 5 likewise meets the thread 18b of the upper half 16b of the main nut 11.

If the main nut fails during the operation of the linear drive device, this will at first lead to the already described rupture of the carriers of the safety nut 12. The safety nut 12 will now carry the load and will be displaced within the recess 20 as long as the safety nut is in contact with an upper or lower limiting surface 20c, 20d of the recess 20 (depending on the direction of action of the drive, pulling or pushing direction). When the push rod 4 withdraws in the direction of the motor 8 of the linear drive device, the load acting on the safety nut causes a relatively strong frictional force, which leads to the development of static friction between the friction partners, to act between the upper limiting surface 20c and the safety nut 12. The push rod 4 can be moved as a result linearly together with the load in the direction of the motor 8.

If, by contrast, the push rod 4 seeks to extend because of the opposite direction of the spindle 5 compared to the above direction, the safety nut 12 will come into contact with the lower limiting surface 20d of the recess 20. However, the load to be borne by the push rod 4 does not press the safety nut 12 against the lower limiting surface 20d in this case. The frictional force between the safety nut and the threaded nut body 16 is thus comparatively weak, and the safety nut 12 will therefore rotate on the thread of the spindle 5 without generating a linear displacing motion.

While specific embodiments of the invention have been shown and described in detail to illustrate the application of the principles of the invention, it will be understood that the invention may be embodied otherwise without departing from such principles.

LIST OF REFERENCE NUMBERS

1 Telescopic lifting column
2 Telescopic tubes
3 Stand element
4 Push rod
5 Spindle
6 Linear drive device
7 External thread of spindle
8 Motor
9 Threaded nut means
11 Main nut
12 Safety nut
13 Pin
14 Cover plate
15 Axis of rotation
16 Threaded nut body
16a Half
16b Half 18a Threaded section
18b Threaded section
19 Web
20 Recess
20a Limiting surface
20b Limiting surface
20c Limiting surface
20d Limiting surface
21 Holding piece
21a Leg
21b Leg
21c Leg
21d Leg
21e Leg
21f Leg
21g Ring part
23 Carrier
24 Groove
25 Cam
27 Internal thread
28 Circumferential surface
29 Notch

What is claimed is:

1. A threaded nut device for a linear drive provided with a rotatable spindle, the threaded nut device comprising:
   a main nut having an internal thread for engagement on the external thread of the rotatable spindle, said main nut for performing a translatory displacing motion during a rotary motion of the spindle; and
   a safety nut having an internal thread for not engaging the external thread of the spindle during the normal operation of the linear drive and for meshing with the external thread of the spindle in case of failure of said main nut, said main nut having a first part and a second part, said first part and said second part being located at spaced locations from one another, said first part being provided with a threaded section of said main nut internal thread and said second part being provided with a threaded section of said main nut internal thread, said safety nut being arranged between said first part threaded section and said second part threaded section.

2. A threaded nut device in accordance with claim 1, wherein said two threaded sections of said main nut are essentially of equal length, said threaded section of said first part being located at a spaced location from said threaded section of said second part.

3. A threaded nut device in accordance with claim 1, wherein one thread start of one said threaded section is arranged at a radial and axial point that corresponds to a continuation of the thread of said other threaded section, said first part being located at a distance from said second part, said first part having a first part cylindrical recess, said second part having a second part cylindrical recess, said main nut comprising at least one web, said first part being connected to said second part via said at least one web.

4. A threaded nut device in accordance with claim 1, further comprising a positioning aid for positioning said safety nut in a predetermined position in relation to said main nut between said two threaded sections.

5. A threaded nut device in accordance with claim 4, wherein said positioning aid has means for positioning said safety nut in a predetermined radial position.

6. A threaded nut device in accordance with claim 5, wherein said means for positioning in a predetermined radial position is provided at said safety nut and is arranged in a predetermined position in relation to a thread start of said safety nut.

7. A threaded nut device in accordance with claim 4, wherein said positioning aid has means for positioning said safety nut in a predetermined axial position.

8. A threaded nut device in accordance with claim 7, wherein said means for positioning said safety nut in a predetermined axial position has a holder, which is intended for receiving said safety nut.

9. A threaded nut device in accordance with claim 8, wherein said holder can be inserted into an area between said two threaded sections.

10. A threaded nut device in accordance with claim 9, wherein said positioning aid has a means that makes it possible to arrange said holder in a position in which a longitudinal axis of said safety nut is aligned with the longitudinal axis of said two threaded sections.

11. A threaded nut device in accordance with claim 1, wherein a length of said safety nut in an axial direction corresponds at least essentially to a distance between said two threaded sections.

12. A threaded nut device in accordance with claim 1, wherein said safety nut can be turned onto the spindle in exactly one axial position between said threaded sections.

13. A linear drive device for performing a useful translatory motion, the linear drive device comprising:
    a drive with a rotatingly driven spindle;
    a threaded nut comprising a main nut, with an internal thread for engagement on an external thread of the rotatable driven spindle, and a safety nut, wherein the threaded nut is secured against rotary motions, as a result of which the rotary motion of the spindle leads to a translatory motion of said main nut, said safety nut having said internal thread for not engaging the external thread of the spindle during the normal operation of the linear drive and for meshing with the external thread of the spindle in case of failure of said main nut, said main nut having a first part and a second part, said first part and said second part being located at spaced locations from one another, wherein said first part and said second part define a space, said first part being provided with a first part threaded section of said main nut internal thread and said second part being provided with a second part threaded section of said main nut internal thread, said safety nut being arranged in said space, wherein said safety nut is located between said first part threaded section and said second part threaded section.

14. A linear drive device for performing a useful translatory motion, the linear drive device comprising:
    a drive with a rotatingly driven spindle with external thread;
    a main nut having a first part and a second part, said first part being located at a spaced location from said second part being, said first part being provided with a first part threaded section for engagement on the external thread of said spindle and said second part being provided with a second part threaded section for engagement on the external thread of said spindle; and
    a safety nut having an internal thread for not engaging the external thread of the spindle during the normal operation of the linear drive and for meshing with the external thread of the spindle in case of failure of said main nut, said safety nut being arranged between said first part threaded section and said second part threaded section.

15. A linear drive device in accordance with claim 13, wherein said first part threaded section is located at a spaced location from said second part threaded section.

16. A linear drive device in accordance with claim 13, wherein said first part is located at a distance from said second part, said first part having a first part cylindrical recess, said second part having a second part cylindrical recess.

17. A linear device in accordance with claim 13, wherein said threaded nut comprises at least one web, said first part being connected to said second part via said at least one web.

18. A linear device in accordance with claim 13, wherein said positioning aid has means for positioning said safety nut in a predetermined axial position, said means for positioning said safety nut in a predetermined axial position comprising a holder.

19. A linear device in accordance with claim 18, wherein said holder is inserted into an area between said two threaded sections, said holder receiving said safety nut, said holder comprising a means for securing against rotation with respect to said threaded nut.

20. A linear device in accordance with claim 18, wherein said holder has a means for securing against rotation with respect to said safety nut, said safety nut having a means for securing against rotation with respect to said holder.

21. A linear device in accordance with claim 13, wherein said holder and said safety nut are provided with a means for securing an insertion of said safety nut on a correct side in said holder.

* * * * *